UNITED STATES PATENT OFFICE.

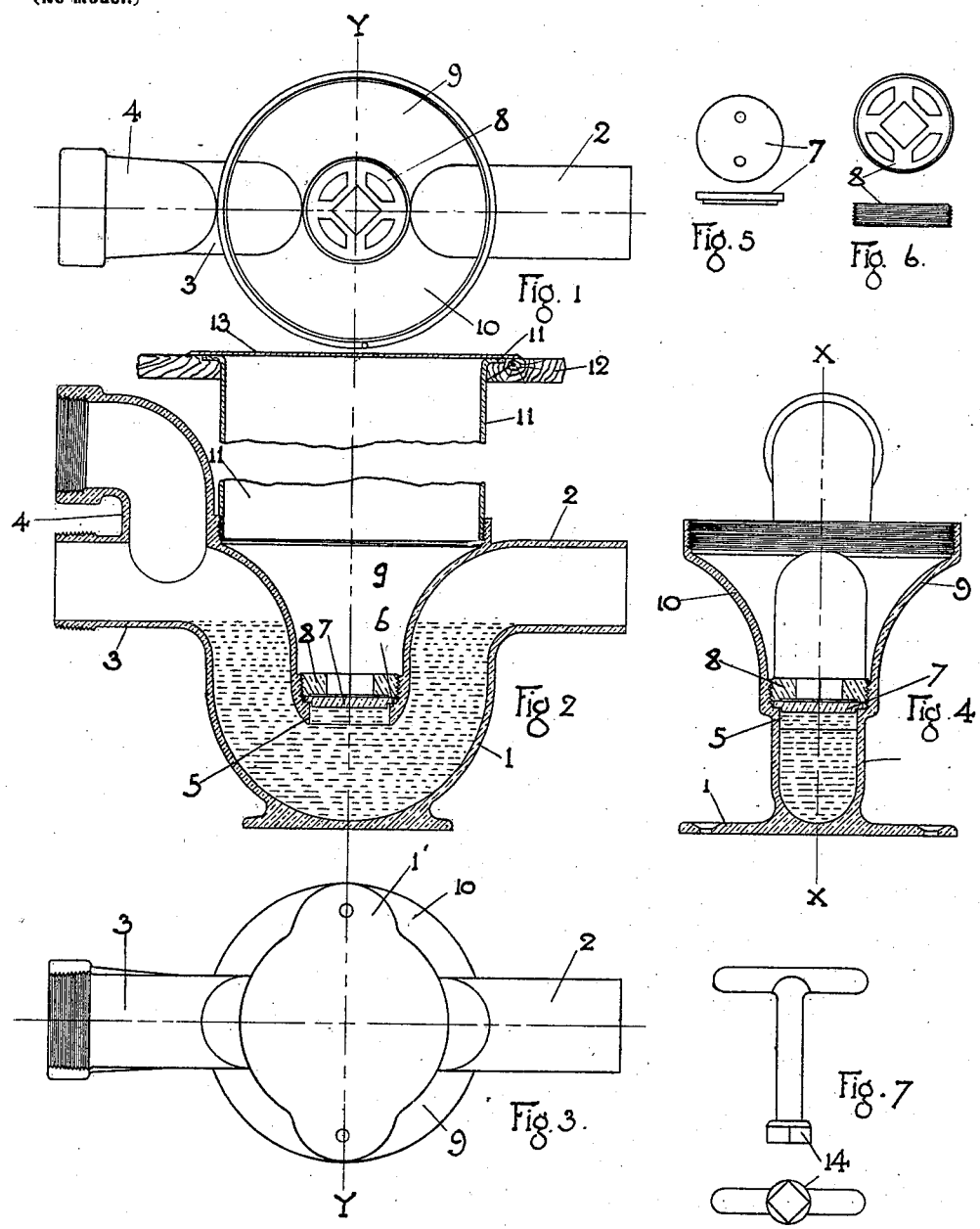

TIMOTHY J. FITZPATRICK, OF BOSTON, MASSACHUSETTS.

TRAP.

SPECIFICATION forming part of Letters Patent No. 661,122, dated November 6, 1900.

Application filed March 10, 1900. Serial No. 8,126. (No model.)

*To all whom it may concern:*

Be it known that I, TIMOTHY J. FITZPATRICK, a citizen of the United States, and a resident of Boston, in the county of Suffolk and State of Massachusetts, have invented certain new and useful Improvements in Traps, of which the following is a specification.

In house-plumbing the bath-tub trap is usually placed between the floor of the bath-room and the ceiling of the room below. The form of trap used at this point has usually been either the running S-trap or a pot-trap. The former is, however, much preferred from a sanitary point of view, as the free course of the water therethrough keeps it washed free of sediment and other impurities. In the pot-trap there is considerable chance for such impurities to collect, though this form of trap is used to some extent where its use is permitted by the plumbing regulations. As a trap which is in the position above referred to is inaccessible from below, it is necessary to have the trap screw or clean-out either at the side or on top of the discharge side of the trap. The latter location is particularly convenient in the pot-trap; but in many cities the plumbing regulations require that the trap-screw be water-sealed, and this has necessitated the location thereof on the side of the trap below the water-line therein. When this is done, it is necessary to inclose the trap in a metal-lined box, so that if one has occasion to remove the trap-screw the water in the trap which is above the opening may flow therein and will not wet the ceiling below. The cost of this metal-lined box and of putting it in place is considerable. Moreover, after the trap-water runs into it when the trap-screw is removed it is considerable trouble to clean it out properly. When this construction is used, it is necessary to make a considerable portion of the floor of the bath-room removable, and this is particularly objectionable in a tiled bath-room.

The object of my invention is to overcome the difficulties above referred to. I accomplish this object by providing a running S-trap with a clean-out opening at a point between the legs of the trap on the upper side of the bend and below the water-level and by inclosing said opening in such a manner that it is impossible for any water to escape to the ceiling below when the trap-screw is removed.

For a more complete disclosure of my invention reference is made to the accompanying drawings, in which—

Figure 1 is a plan view showing the floor-plate removed. Fig. 2 is a cross-section on the line X X of Fig. 4. Fig. 3 is a bottom plan view. Fig. 4 is a cross-section on the line Y Y, Figs. 1, 2, and 3. Figs. 5 and 6 are detail views of the parts of the trap-screw. Fig. 7 is a detail view of the wrench for removing the trap-screw.

The main body 1 of the trap has a baseplate 1' and is provided with the usual inlet 2, outlet 3, and vent-pipe 4. An opening 5 is provided on the upper side of the trap midway between the inlet and discharge legs thereof and at a point considerably below the water-line therein. The upper side of said opening is provided with a valve-seat 6, and a plate 7 is fitted to said seat. A screw-thread is provided above said seat 6, and a nut 8 is adapted to engage the same to clamp plate 7 to its seat, producing what is known as a "ground-joint." Side walls 9 and 10 are cast integral with the trap and extend from each side of one leg of the trap to the corresponding side of the opposite leg, forming a water-tight pocket, in which the trap clean-out is located. These walls 9 and 10 flare outwardly and extend upwardly and terminate a short distance above the level of the upper sides of the inlet and outlet pipes, and a continuation of said walls extends over the tops of said pipes, so that their upper edges are continuous. The portion of said walls next the upper edge is vertical and circular and is provided with an internal screw-thread. A pipe 11, having a correspondingly-threaded lower end, is screwed into the circular upper end of said walls 9 and 10 and extends upwardly to the surface of the floor 12, where it may be provided with a flange 11'. A floor-plate 13, which is made of plated metal, is secured to the floor over the end of pipe 11 and completely closes the same. All parts of the trap are preferably made of brass cast in one piece, as shown. A wrench 14 is provided for unscrewing the nut 8.

A trap which is constructed as above described possesses numerous advantages over the various forms of traps which have previously been used.

The form of trap shown is a most desirable one for the purpose described, as it keeps itself clean without attention. If a house is to be closed in winter and it is desired to remove the water from the trap to prevent freezing, it is simply necessary to remove the floor-plate, unscrew the nut 8, and remove the plate 7, after which the water may be readily removed from the trap with a sponge. If there is any obstruction in the trap, it may be readily removed through the opening 5, and access to the interior of the trap may be had much more readily through said opening than if it were at the side, as has been previously the custom. When the plug which closes the opening 5 is removed, there is no chance for the water to escape to the ceiling below, as all the water which flows up through the opening will be retained by the walls 9 and 10. If a stoppage should occur beyond the trap and the water should be backed up at the inlet end, there would still be no danger of wetting the ceiling below, as the water would first have to fill the pipe 11 before it could overflow at all, and when it did overflow it would be onto the floor of the bath-room. Ordinarily, however, the combined capacity of the pipe 11 and of the chamber inclosed by the walls 9 and 10 and the legs of the trap will be at least equal to the capacity of the discharge-pipe of the bath-tub from the valve of the tub to the trap.

By my construction I secure all the advantages of convenience of access to the trap which is possessed by the pot-trap with a top clean-out opening, and in addition I provide a trap clean-out which is absolutely water-sealed, and yet if there should be any leakage through the clean-out there would be no chance for the escape of sewer-gas or for the water which might leak through to drip down and do any damage.

Having described my invention, what I claim as new, and desire to secure by Letters Patent of the United States, is as follows:

1. A trap having a clean-out opening located between its inlet and discharge legs, below the water-line in the trap and on the upper side thereof, means for closing said opening, and imperforate walls which are cast integral with the trap and extend between the legs thereof on each side of said opening, said walls and the legs of the trap forming a water-tight pocket in which the clean-out opening is located, and which is wholly disconnected from the passage-way through the trap, except through said clean-out opening.

2. A trap of the character described, having an opening between the inlet and discharge legs of the trap, below the water-line and on the upper side thereof, means for closing said opening, upwardly-extending imperforate walls which are integrally connected with the legs of said trap at their sides and bottoms and surround said opening, forming a chamber in which said opening is located, and which is wholly disconnected from the passage-way through the trap except through said clean-out opening, and a pipe which is connected to said walls at their upper edges.

3. An S-trap of the character described having an opening in the upper side midway between the inlet and discharge legs thereof, a screw-plug for closing said opening, imperforate walls which are cast integrally with the body of the trap and extend from the side of one leg to the same side of the opposite leg on each side of the trap, said walls extending over and meeting on the upper sides of said legs and forming a continuous, circular wall, screw-threads formed on said circular portion, and an imperforate pipe having a screw-threaded end which engages the threads of said wall and extends upwardly therefrom, forming a chamber which is wholly disconnected from the passage through the trap, except through said clean-out opening.

4. An S-trap of the character described having an opening at the upper side, and between the inlet and discharge legs thereof, a screw-plug for closing said opening, imperforate walls which are integrally connected with the legs of said trap at their sides and bottoms, said walls surrounding said opening and terminating at their upper edges in a circular wall which extends over the upper sides of the legs of the trap, a pipe having a screw-threaded connection with said circular wall and which extends upwardly to the floor of the room above said trap, said walls, pipe and trap combining to form a water-tight chamber which is wholly disconnected from the passage-way through the trap, and a cover for closing the top of said pipe.

In testimony whereof I have affixed my signature in presence of two witnesses.

TIMOTHY J. FITZPATRICK.

Witnesses:
LOUIS H. HARRIMAN,
EDITH L. COPELAND.